(12) United States Patent
Yu et al.

(10) Patent No.: US 10,061,395 B2
(45) Date of Patent: Aug. 28, 2018

(54) BUTTON STRUCTURE, MANUFACTURING METHOD THEREOF, AND GAME CONTROLLER USING THE SAME

(71) Applicant: Primax Electronics Ltd., Neihu, Taipei (TW)

(72) Inventors: Tsu-Hui Yu, Taipei (TW); Shu-An Huang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 373 days.

(21) Appl. No.: 15/149,537

(22) Filed: May 9, 2016

(65) Prior Publication Data
US 2017/0262067 A1    Sep. 14, 2017

(30) Foreign Application Priority Data
Mar. 11, 2016  (TW) .............................. 105107580 A

(51) Int. Cl.
*A63F 13/00* (2014.01)
*G06F 3/02* (2006.01)
*A63F 13/24* (2014.01)
*H01H 13/02* (2006.01)

(52) U.S. Cl.
CPC ............ *G06F 3/0202* (2013.01); *A63F 13/24* (2014.09); *G06F 3/0219* (2013.01); *H01H 13/02* (2013.01)

(58) Field of Classification Search
CPC .......................... A63F 13/24; A63F 2300/1056
See application file for complete search history.

(56) References Cited

U.S. PATENT DOCUMENTS

| 4,687,200 | A | * | 8/1987 | Shirai | ..................... A63F 13/06 200/339 |
| 6,102,802 | A | * | 8/2000 | Armstrong | .............. A63F 13/06 463/37 |
| 6,818,845 | B2 | * | 11/2004 | Portmann | .............. H01H 23/06 200/302.3 |
| 2008/0018600 | A1 | * | 1/2008 | Hou | ...................... G06F 3/0317 345/161 |
| 2008/0261694 | A1 | * | 10/2008 | Zheng | ................ A63B 71/0622 463/37 |

* cited by examiner

*Primary Examiner* — Reginald Renwick
(74) *Attorney, Agent, or Firm* — Kirton McConkie; Evan R. Witt

(57) ABSTRACT

The present invention provides a button structure and a manufacturing method thereof. The button structure includes a base made from a first material, a graphic piece made from a second material, and a transparent piece made from a third material, where the graphic piece is integrally formed with the base and protrudes out beyond an upper surface of the base, the transparent piece wraps the base and the graphic piece, and a heat resistance temperature of the first material and a heat resistance temperature of the second material are both higher than a heat resistance temperature of the third material. In addition, the present invention further provides a game controller using the button structure.

20 Claims, 3 Drawing Sheets

BUTTON STRUCTURE, MANUFACTURING METHOD THEREOF, AND GAME CONTROLLER USING THE SAME

FIELD OF THE INVENTION

The present invention relates to the field of input devices, and in particular, to a button structure, a manufacturing method thereof, and a game controller using the same.

BACKGROUND OF THE INVENTION

With continuous development of science and technology in modern society, electronic products are widely used in daily life. Button structures applied to the electronic products not only need to match the various electronic products, but also continuously develop towards aspects of reducing manufacturing costs, improving manufacturing processes, and increasing yield rates, to increase product competitiveness.

Refer to FIG. 1, which is a schematic structural diagram of a conventional button structure applied to an electronic apparatus. The button structure 1 shown in FIG. 1 is a prism formed by means of an injection process, which has a contact pressure surface 11 that is pressed by a user to drive the electronic apparatus (not shown in the figure) to output a corresponding control instruction. A text 12 or graph for marking the button structure is printed on the contact pressure surface 11.

However, the conventional button structure 1 is insufficient in a three-dimensional effect, and after the contact pressure surface 11 of the button structure 1 is frequently pressed by the user, the text 12 or graph printed on the pressing surface 11 drops off easily. Therefore, there is room for improvement of the conventional button structure.

SUMMARY OF THE INVENTION

A first objective of the present invention is to provide a button structure, and in particular, relates to a button structure whose graphic piece is wrapped by a transparent piece and is accordingly protected.

A second objective of the present invention is to provide a manufacturing method for a button structure, and in particular, relates to a manufacturing method in which operations are reduced and costs are reduced by means of a double injection process.

A third objective of the present invention is to provide a game remote control using the button structure, to provide a desired contact pressure feel to a user.

In an exemplary embodiment, the present invention provides a button structure, including:

a base, having an upper surface and made from a first material;

a graphic piece, integrally formed with the base and at least partially protruding out beyond the upper surface of the base, where the graphic piece is made from a second material; and a transparent piece, wrapping the base and the graphic piece and made from a third material, where a heat resistance temperature of the third material is lower than a heat resistance temperature of the first material and a heat resistance temperature of the second material.

In an exemplary embodiment, the present invention also provides a game controller, including:

a housing;

a button structure, at least partially accommodated in the housing and including:

a base, having an upper surface and made from a first material;

a graphic piece, integrally formed with the base and at least partially protruding out beyond the upper surface of the base, where the graphic piece is made from a second material; and a transparent piece, wrapping the base and the graphic piece and made from a third material, where a heat resistance temperature of the third material is lower than a heat resistance temperature of the first material and a heat resistance temperature of the second material; and a processing unit, disposed in the housing, and used to generate and output a corresponding control instruction when the transparent piece is pressed.

In an exemplary embodiment, the present invention provides a manufacturing method for a button structure, including:

forming a base and a graphic piece by means of a double injection process, where the graphic piece at least partially protrudes out beyond an upper surface of the base; and wrapping the base and the graphic piece up in a transparent piece by means of an over-molding process.

DETAILED DESCRIPTION OF THE PREFERRED EMBODIMENT

Figure 1:
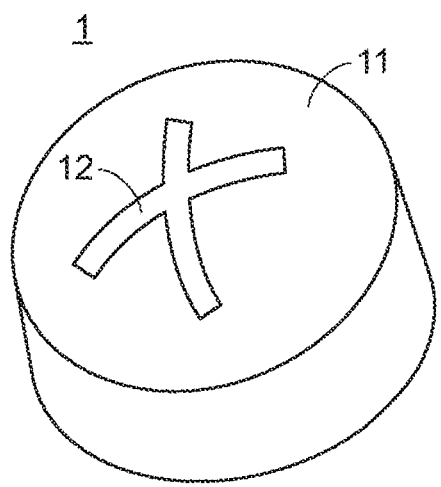
FIG. 1 is a schematic structural diagram of a conventional button structure applied to an electronic apparatus.
Figure 2:
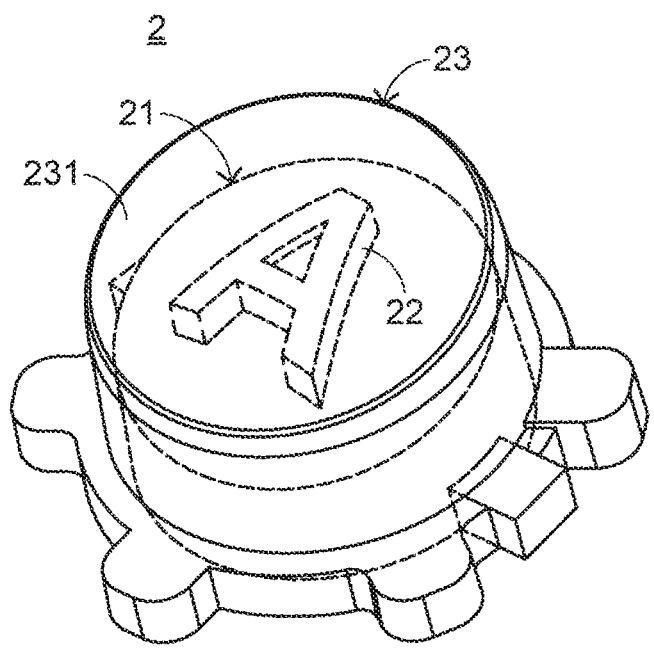
FIG. 2 is a schematic structural diagram of an exemplary embodiment of a button structure of the present invention.
Figure 3:
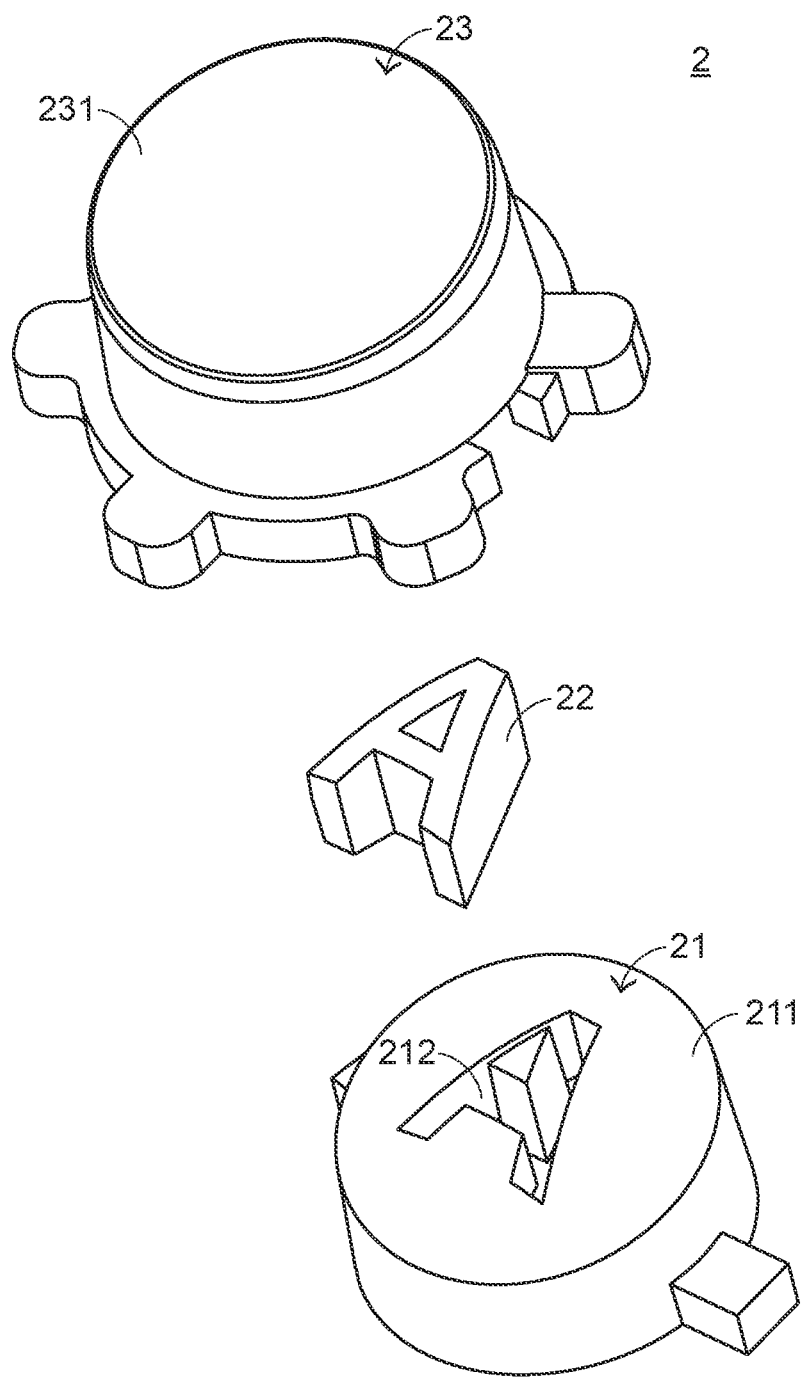
FIG. 3 is a schematic three-dimensional exploded diagram of the button structure shown in FIG. 2.

Referring to FIG. 2 and FIG. 3, FIG. 2 is a schematic structural diagram of an exemplary embodiment of a button structure of the present invention, and FIG. 3 is a schematic three-dimensional exploded diagram of the button structure shown in FIG. 2. The button structure 2 includes a base 21, a graphic piece 22, and a transparent piece 23. The base 21 has an upper surface 211. The graphic piece 22 is integrally formed with the base 21, and protrudes out beyond the upper surface 211 of the base 21, to mark the button structure 2 and provide a three-dimensional effect. The transparent piece 23 wraps the base 21 and the transparent piece 23, and has a contact pressure surface 231 for a user to press. The base 21, the graphic piece 22, and the transparent piece 23 are respectively made from a first material, a second material, and a third material, and a heat resistance temperature of the first material and a heat resistance temperature of the second material are higher than a heat resistance temperature of the third material.

In this exemplary embodiment, the contact pressure surface 231 of the transparent piece 23 is a flat surface, and is used to provide a desired contact pressure feel to a user. The graphic piece 22 for marking the button structure 2 is in a font shape (for example, a font A shown in the figure), but is not limited thereto. The graphic piece 22 may also be in a geometric shape, for example, a circle, a triangle, or a rectangle. Further, in this exemplary embodiment, the first material and the second material are both of polycarbonate (PC) materials, while the third material is of an acrylic plastic (PMMA) material. The foregoing description is only an embodiment, and the first material and the second material may also be of different materials. A person skilled in the art may use any suitable materials to manufacture the base 21, the graphic piece 22, and the transparent piece 23 according to an actual application requirement.

Figure 4:
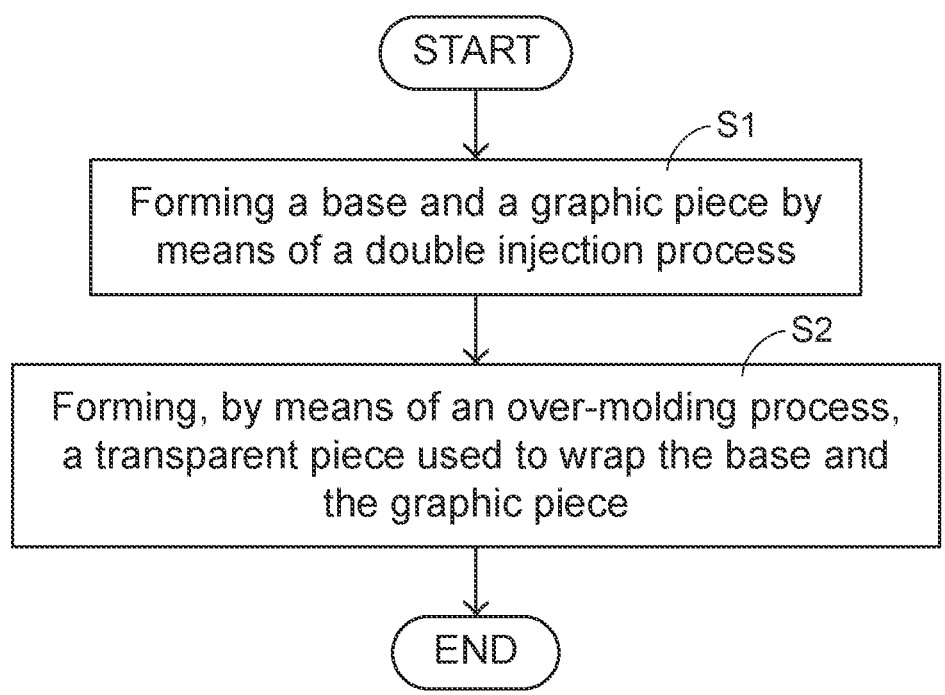
FIG. 4 is an exemplary method flowchart of a manufacturing method for a button structure 2 of the present invention.

Refer to FIG. 4, which is an exemplary method flowchart of a manufacturing method for a button structure of the present invention. The manufacturing method for a button structure 2 includes: step S1: first forming a base 21 and a graphic piece 22 by means of a double injection process; and step S2: forming, by means of an over-molding process, a transparent piece 23 used to wrap the base 21 and the graphic piece 22. Regardless whether a first material of the base 21 is the same as a second material of the graphic piece 22, or whether a color of the base 21 is the same as that of the graphic piece 22, the base 21 and the graphic piece 22 may be simultaneously formed by means of the double injection process, to reduce operations and reduce costs. Moreover, bond strength of the base 21 and the graphic piece 22 may be further increased.

It should be further noted that a reason why a heat resistance temperature of the first material and a heat resistance temperature of the second material must be higher than a heat resistance temperature of a third material, which is described above, is to prevent the base 21 and the graphic piece 22 from being intenerated or deformed because a working temperature for manufacturing of the third material affects the already formed base 21 and graphic piece 22 during the over-molding process.

Exemplarily but unlimitedly, the base 21 further has a groove 212 extending inward from an upper surface 211 of the base 21, so that a part of the graphic piece 22 is accommodated in the groove 212. An objective of such design is that after the graphic piece 22 and the base 21 are formed, the graphic piece 22 and the base 21 are bond more firmly and do not drop off easily.

Figure 5:
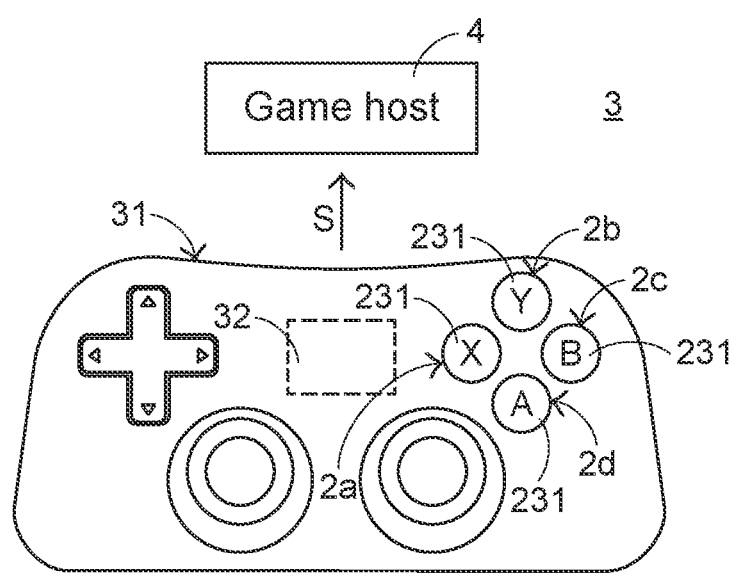
FIG. 5 is a schematic structural diagram of an exemplary embodiment of a game controller of the present invention.

Refer to FIG. 5, which is a schematic structural diagram of an exemplary embodiment of a game controller of the present invention. The game controller 3 includes a housing 31, a processing unit 32, and a plurality of button structures 2a to 2d, each of the button structures 2a to 2d is accommodated in the housing 31, and only a contact pressure surface 231 of the transparent piece 23 is exposed outside the housing 31. The processing unit 32 is disposed in the housing 31, and outputs, when any one of the button structures 2a to 2d is pressed, a corresponding control instruction S to a game host 4 connected to a game controller 3. Any one of the button structures 2a to 2d of the game controller 3 is used to mark a shape of the graphic piece 22 of the button structure 2, and other details are all substantially the same as those of the button structure shown in FIG. 2. Therefore, details are not described herein again.

It can be learned according to the foregoing descriptions that because the graphic piece of the button structure of the present invention is wrapped by the transparent piece and accordingly is protected, a deficiency that a text or graph printed on a conventional button structure drops off easily due to regular pressure is improved, and a desired contact pressure feel and a desired appearance are provided. In addition, the application of the button structure of the present invention is not limited to the foregoing game controller, and various electronic apparatuses, for example, a television remote control and a mobile device may fall within its application scope. A person skilled in the art may make any equivalent change and design according to an actual application requirement.

The foregoing descriptions are only exemplary embodiments of the present invention, but are not intended to limit the application scope of the present invention. Any equivalent variation and modification made without departing from the spirit disclosed in the present invention shall fall within the application scope of the present technical solutions.

What is claimed is:

1. A button structure, comprising:
   a base, having an upper surface and made from a first material;
   a graphic piece, integrally formed with the base and at least partially protruding out beyond the upper surface of the base, wherein the graphic piece is made from a second material; and
   a transparent piece, wrapping the base and the graphic piece and made from a third material, wherein a heat resistance temperature of the third material is lower than a heat resistance temperature of the first material and a heat resistance temperature of the second material.

2. The button structure according to claim 1, wherein the base has a groove extending inward from the upper surface, and at least a part of the graphic piece is accommodated in the groove.

3. The button structure according to claim 1, wherein the base and the graphic piece are formed by means of a double injection process.

4. The button structure according to claim 1, wherein the transparent piece is formed by means of an over-molding process.

5. The button structure according to claim 1, wherein the graphic piece is in a font shape or a geometric shape.

6. The button structure according to claim 1, wherein both the first material and the second material are of polycarbonate (PC) materials.

7. The button structure according to claim 1, wherein the third material is of an acrylic plastic (PMMA) material.

8. A game controller, comprising:
   a housing;
   a button structure, at least partially accommodated in the housing and comprising:
   a base, having an upper surface and made from a first material;
   a graphic piece, integrally formed with the base and at least partially protruding out beyond the upper surface of the base, wherein the graphic piece is made from a second material; and
   a transparent piece, wrapping the base and the graphic piece and made from a third material, wherein a heat resistance temperature of the third material is lower than a heat resistance temperature of the first material and a heat resistance temperature of the second material; and
   a processing unit, disposed in the housing, and used to generate and output a corresponding control instruction when the transparent piece is pressed.

9. The game controller according to claim 8, wherein the base has a groove extending inward from the upper surface, and at least a part of the graphic piece is accommodated in the groove.

10. The game controller according to claim 8, wherein the base and the graphic piece are formed by means of a double injection process.

11. The game controller according to claim 8, wherein the transparent piece is formed by means of an over-molding process.

12. The game controller according to claim 8, wherein the graphic piece is in a font shape or a geometric shape.

13. The game controller according to claim 8, wherein both the first material and the second material are of polycarbonate (PC) materials.

14. The game controller according to claim 8, wherein the third material is of an acrylic plastic (PMMA) material.

15. A manufacturing method for a button structure, comprising:
    forming a base and a graphic piece by means of a double injection process, wherein the graphic piece at least partially protrudes out beyond an upper surface of the base; and
    wrapping the base and the graphic piece up in a transparent piece by means of an over-molding (Over-molding) process.

16. The manufacturing method for a button structure according to claim 15, wherein the base, the graphic piece, and the transparent piece are respectively made from a first material, a second material, and a third material, and a heat resistance temperature of the third material is lower than a heat resistance temperature of the first material and a heat resistance temperature of the second material.

17. The manufacturing method for a button structure according to claim 16, wherein both the first material and the second material are of polycarbonate (PC) materials.

18. The manufacturing method for a button structure according to claim 16, wherein the third material is of an acrylic plastic (PMMA) material.

19. The manufacturing method for a button structure according to claim 15, wherein the graphic piece is in a font shape or a geometric shape.

20. The manufacturing method for a button structure according to claim 15, wherein the base has a groove extending inward from the upper surface, and at least a part of the graphic piece is accommodated in the groove.

* * * * *